United States Patent
Li (10) Patent No.: US 10,970,212 B2
(45) Date of Patent: Apr. 6, 2021

(54) METHOD AND SYSTEM FOR FACILITATING A DISTRIBUTED STORAGE SYSTEM WITH A TOTAL COST OF OWNERSHIP REDUCTION FOR MULTIPLE AVAILABLE ZONES

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 15 days.

(21) Appl. No.: 16/277,708

(22) Filed: Feb. 15, 2019

(65) Prior Publication Data
US 2020/0264978 A1    Aug. 20, 2020

(51) Int. Cl.
| G06F 12/08 | (2016.01) |
| G06F 12/0806 | (2016.01) |
| G06F 3/06 | (2006.01) |

(52) U.S. Cl.
CPC ........ *G06F 12/0806* (2013.01); *G06F 3/0604* (2013.01); *G06F 3/067* (2013.01); *G06F 3/0655* (2013.01); *G06F 3/0679* (2013.01); *G06F 2212/7208* (2013.01)

(58) Field of Classification Search
CPC ...... G06F 3/0604; G06F 3/067; G06F 3/0655; G06F 3/0679; G06F 12/0806; G06F 2212/7208
See application file for complete search history.

(56) References Cited

U.S. PATENT DOCUMENTS

| 3,893,071 A | 7/1975 | Bossen |
| 4,718,067 A | 1/1988 | Peters |
| 5,394,382 A | 2/1995 | Hu |
| 5,732,093 A | 3/1998 | Huang |
| 5,802,551 A | 9/1998 | Komatsu |

(Continued)

FOREIGN PATENT DOCUMENTS

WO    9418634    8/1994

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Hiep T Nguyen
(74) *Attorney, Agent, or Firm* — Shun Yao; Park, Vaughan, Fleming & Dowler LLP (57) ABSTRACT

One embodiment facilitates data placement in a storage device. During operation, the system receives, from a host, a request to read data. The system determines that the data is not available in a read cache. The system issues the read request to a solid state drive and a first hard disk drive. In response to unsuccessfully reading the requested data from the solid state drive and successfully reading the requested data from the first hard disk drive, the system sends the requested data to the host. In response to unsuccessfully reading the requested data from both the solid state drive and the first hard disk drive: the system issues the read request to a second hard disk drive; and the system sends the requested data to the host.

20 Claims, 9 Drawing Sheets

(56) References Cited

U.S. PATENT DOCUMENTS

| | | | |
|---|---|---|---|
| 5,930,167 A | 7/1999 | Lee | |
| 6,098,185 A | 8/2000 | Wilson | |
| 6,148,377 A | 11/2000 | Carter | |
| 6,457,104 B1 | 9/2002 | Tremaine | |
| 6,658,478 B1* | 12/2003 | Singhal | H04L 67/42 709/232 |
| 7,351,072 B2 | 4/2008 | Muff | |
| 7,599,139 B1 | 10/2009 | Bombet | |
| 7,953,899 B1* | 5/2011 | Hooper | G06F 13/385 710/5 |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,281,061 B2 | 10/2012 | Radke | |
| 8,751,763 B1 | 6/2014 | Ramarao | |
| 8,825,937 B2 | 9/2014 | Atkisson | |
| 8,868,825 B1 | 10/2014 | Hayes | |
| 8,904,061 B1* | 12/2014 | O'Brien, III | G06F 12/0866 710/39 |
| 9,015,561 B1 | 4/2015 | Hu | |
| 9,043,545 B2 | 5/2015 | Kimmel | |
| 9,088,300 B1 | 7/2015 | Chen | |
| 9,129,628 B1 | 9/2015 | Fallone | |
| 9,280,472 B1 | 3/2016 | Dang | |
| 9,280,487 B2 | 3/2016 | Candelaria | |
| 9,336,340 B1 | 5/2016 | Dong | |
| 9,436,595 B1 | 9/2016 | Benitez | |
| 9,529,601 B1 | 12/2016 | Dharmadhikari | |
| 9,588,698 B1 | 3/2017 | Karamcheti | |
| 9,588,977 B1 | 3/2017 | Wang | |
| 9,747,202 B1 | 8/2017 | Shaharabany | |
| 9,852,076 B1 | 12/2017 | Garg | |
| 9,875,053 B2 | 1/2018 | Frid | |
| 1,001,316 A1 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,318,467 B2 | 6/2019 | Barzik | |
| 10,437,670 B1 | 10/2019 | Koltsidas | |
| 10,649,657 B2 | 5/2020 | Zaidman | |
| 2001/0032324 A1 | 10/2001 | Slaughter | |
| 2002/0073358 A1 | 6/2002 | Atkinson | |
| 2002/0095403 A1 | 7/2002 | Chandrasekaran | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0066741 A1* | 4/2004 | Dinker | G06F 11/1662 370/216 |
| 2004/0103238 A1 | 5/2004 | Avraham | |
| 2005/0177672 A1 | 8/2005 | Rao | |
| 2005/0195635 A1 | 9/2005 | Conley | |
| 2005/0235067 A1 | 10/2005 | Creta | |
| 2006/0031709 A1* | 2/2006 | Hiraiwa | G06F 11/2028 714/6.1 |
| 2007/0061502 A1 | 3/2007 | Lasser | |
| 2007/0101096 A1 | 5/2007 | Gorobets | |
| 2007/0283081 A1 | 12/2007 | Lasser | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0301532 A1 | 12/2008 | Uchikawa | |
| 2009/0089544 A1 | 4/2009 | Liu | |
| 2009/0113219 A1 | 4/2009 | Aharonov | |
| 2009/0287956 A1 | 11/2009 | Flynn | |
| 2009/0307249 A1 | 12/2009 | Koifman | |
| 2009/0310412 A1 | 12/2009 | Jang | |
| 2010/0169470 A1 | 7/2010 | Takashige | |
| 2010/0217952 A1 | 8/2010 | Iyer | |
| 2010/0332922 A1 | 12/2010 | Chang | |
| 2011/0055471 A1 | 3/2011 | Thatcher | |
| 2011/0099418 A1 | 4/2011 | Chen | |
| 2011/0161784 A1 | 6/2011 | Selinger | |
| 2011/0191525 A1 | 8/2011 | Hsu | |
| 2011/0218969 A1 | 9/2011 | Anglin | |
| 2011/0258514 A1 | 10/2011 | Lasser | |
| 2011/0299317 A1 | 12/2011 | Shaeffer | |
| 2012/0084523 A1 | 4/2012 | Littlefield | |
| 2012/0089774 A1 | 4/2012 | Kelkar | |
| 2012/0096330 A1 | 4/2012 | Przybylski | |
| 2012/0147021 A1 | 6/2012 | Cheng | |
| 2012/0159099 A1* | 6/2012 | Lindamood | H04L 67/1097 711/162 |
| 2012/0159289 A1 | 6/2012 | Piccirillo | |
| 2012/0173792 A1 | 7/2012 | Lassa | |
| 2012/0210095 A1 | 8/2012 | Nellans | |
| 2012/0278283 A1* | 11/2012 | Hildebrand | G06F 3/0619 707/634 |
| 2012/0278579 A1 | 11/2012 | Goss | |
| 2012/0284587 A1 | 11/2012 | Yu | |
| 2013/0054822 A1* | 2/2013 | Mordani | H04L 69/40 709/228 |
| 2013/0061029 A1 | 3/2013 | Huff | |
| 2013/0080391 A1 | 3/2013 | Raichstein | |
| 2013/0151759 A1 | 6/2013 | Shim | |
| 2013/0191601 A1 | 7/2013 | Peterson | |
| 2013/0219131 A1 | 8/2013 | Alexandron | |
| 2013/0238955 A1 | 9/2013 | D Abreu | |
| 2014/0006688 A1 | 1/2014 | Yu | |
| 2014/0019650 A1 | 1/2014 | Li | |
| 2014/0025638 A1* | 1/2014 | Hu | G06F 11/1464 707/654 |
| 2014/0082273 A1 | 3/2014 | Segev | |
| 2014/0095827 A1 | 4/2014 | Wei | |
| 2014/0108414 A1 | 4/2014 | Stillerman | |
| 2014/0181532 A1 | 6/2014 | Camp | |
| 2014/0195564 A1 | 7/2014 | Talagala | |
| 2014/0279927 A1 | 9/2014 | Constantinescu | |
| 2014/0304452 A1 | 10/2014 | De La Iglesia | |
| 2015/0019798 A1 | 1/2015 | Huang | |
| 2015/0106559 A1 | 4/2015 | Cho | |
| 2015/0121031 A1 | 4/2015 | Feng | |
| 2015/0227316 A1 | 8/2015 | Warfield | |
| 2015/0234845 A1 | 8/2015 | Moore | |
| 2015/0269964 A1 | 9/2015 | Fallone | |
| 2015/0277937 A1 | 10/2015 | Swanson | |
| 2015/0301964 A1 | 10/2015 | Brinicombe | |
| 2015/0304108 A1 | 10/2015 | Obukhov | |
| 2015/0347025 A1 | 12/2015 | Law | |
| 2015/0363271 A1 | 12/2015 | Haustein | |
| 2016/0014039 A1 | 1/2016 | Reddy | |
| 2016/0026575 A1 | 1/2016 | Samanta | |
| 2016/0041760 A1 | 2/2016 | Kuang | |
| 2016/0048341 A1 | 2/2016 | Constantinescu | |
| 2016/0077968 A1 | 3/2016 | Sela | |
| 2016/0098350 A1 | 4/2016 | Tang | |
| 2016/0154601 A1* | 6/2016 | Chen | G06F 3/0647 711/111 |
| 2016/0162187 A1 | 6/2016 | Lee | |
| 2016/0179399 A1 | 6/2016 | Melik-Martirosian | |
| 2016/0203000 A1 | 7/2016 | Parmar | |
| 2016/0274636 A1 | 9/2016 | Kim | |
| 2016/0306853 A1 | 10/2016 | Sabaa | |
| 2016/0342345 A1 | 11/2016 | Kankani | |
| 2016/0350385 A1 | 12/2016 | Poder | |
| 2016/0364146 A1 | 12/2016 | Kuttner | |
| 2017/0010652 A1 | 1/2017 | Huang | |
| 2017/0075583 A1 | 3/2017 | Alexander | |
| 2017/0075594 A1 | 3/2017 | Badam | |
| 2017/0091110 A1 | 3/2017 | Ash | |
| 2017/0109199 A1 | 4/2017 | Chen | |
| 2017/0109232 A1 | 4/2017 | Cha | |
| 2017/0147499 A1 | 5/2017 | Mohan | |
| 2017/0161202 A1 | 6/2017 | Erez | |
| 2017/0162235 A1 | 6/2017 | De | |
| 2017/0177217 A1 | 6/2017 | Kanno | |
| 2017/0177259 A1 | 6/2017 | Motwani | |
| 2017/0212708 A1 | 7/2017 | Suhas | |
| 2017/0220254 A1 | 8/2017 | Warfield | |
| 2017/0221519 A1 | 8/2017 | Matsuo | |

(56) References Cited

U.S. PATENT DOCUMENTS

| | | |
|---|---|---|
| 2017/0228157 A1 | 8/2017 | Yang |
| 2017/0249162 A1 | 8/2017 | Tsirkin |
| 2017/0262178 A1 | 9/2017 | Hashimoto |
| 2017/0262217 A1* | 9/2017 | Pradhan ............... G06F 3/0605 |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2018/0024779 A1 | 1/2018 | Kojima |
| 2018/0033491 A1 | 2/2018 | Marelli |
| 2018/0052797 A1 | 2/2018 | Barzik |
| 2018/0107591 A1 | 4/2018 | Smith |
| 2018/0143780 A1 | 5/2018 | Cho |
| 2018/0167268 A1 | 6/2018 | Liguori |
| 2018/0173620 A1 | 6/2018 | Cen |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1* | 10/2018 | Kathpal ............... G06F 16/278 |
| 2018/0329776 A1 | 11/2018 | Lai |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0073262 A1 | 3/2019 | Chen |
| 2019/0087115 A1 | 3/2019 | Li |
| 2019/0171532 A1* | 6/2019 | Abadi ............... G06F 11/1451 |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1* | 12/2019 | Pleshachkov ......... G06F 16/273 |
| 2019/0391748 A1 | 12/2019 | Li |
| 2020/0004456 A1 | 1/2020 | Williams |
| 2020/0004674 A1 | 1/2020 | Williams |
| 2020/0097189 A1 | 3/2020 | Tao |
| 2020/0201814 A1* | 6/2020 | Danilov ............... G06F 16/1734 |

OTHER PUBLICATIONS

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime, "Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

* cited by examiner

READ CACHE LAYER 502
(LARGE CAPACITY, LOCAL, SHORT READ LATENCY)

WRITE CACHE LAYER 504
(SMALL CAPACITY, GLOBAL, MULTIPLE REPLICAS, SHORT WRITE LATENCY, HIGH ENDURANCE)

NORMAL READ LAYER (FROM LOW-COST SSD) 506
(LARGE CAPACITY, GLOBAL, MULTIPLE REPLICAS, SHORT READ LATENCY, LOW ENDURANCE)

BACKUP READ LAYER (FROM LOW-COST HDD) 508
(LARGE CAPACITY, GLOBAL, MULTIPLE REPLICAS, LONG READ LATENCY, HIGH ENDURANCE)

METHOD AND SYSTEM FOR FACILITATING A DISTRIBUTED STORAGE SYSTEM WITH A TOTAL COST OF OWNERSHIP REDUCTION FOR MULTIPLE AVAILABLE ZONES

BACKGROUND

Field

This disclosure is generally related to the field of data storage. More specifically, this disclosure is related to a method and system for facilitating a distributed storage system with a total cost of ownership reduction for multiple available zones.

Related Art

The proliferation of the Internet and e-commerce continues to create a vast amount of digital content. Various distributed storage systems have been created to access and store such digital content. One example of a distributed storage system is a hyperscale storage system, which facilitates achieving a massive scale in computing, e.g., for big data or cloud computing. A hyperscale infrastructure must ensure both high availability and data reliability for the corresponding massive scale in computing. One way to ensure the high availability and data reliability in a hyperscale infrastructure is to use multiple available zones, which are constructed to synchronize data and provide service in a consistent manner. Each available zone may include multiple storage clusters, and each storage cluster may be deployed with a distributed file system which maintains multiple replicas of given data. For example, in a hyperscale infrastructure with three available zones, where each available zone has three replicas, the same data is stored nine times. As current applications continue to pursue and require fast access, all nine of the replicas may be stored on high-speed solid state drives (SSDs). However, these high-speed SSDs can be expensive. Meeting the needs of current applications in this way can thus result in a high cost for the overall storage system. As the hyperscale infrastructure scales out and grows, the ability to provide an efficient system which can both scale out and perform at a reasonable pace becomes critical. Furthermore, the total cost of ownership (TCO) can become a critical factor.

SUMMARY

One embodiment facilitates data placement in a storage device. During operation, the system receives, from a host, a request to read data. The system determines that the data is not available in a read cache. The system issues the read request to a first storage drive and a second storage drive of a different type than the first storage drive. In response to unsuccessfully reading the requested data from the first storage drive and successfully reading the requested data from the second storage drive, the system sends the requested data to the host. In response to unsuccessfully reading the requested data from both the first storage drive and the second storage drive: the system issues the read request to a third storage drive; and the system sends the requested data to the host.

In some embodiments, the system identifies, based on previously stored path information, the first storage drive, the second storage drive, and the third storage drive. The system selects, from a plurality of storage drives on which the data is stored, the second storage drive. The system selects, from the plurality of storage drives, the third storage drive.

In some embodiments, in response to successfully reading the requested data from the first storage drive, the system sends the requested data to the host, and drops data read from the second storage drive.

In some embodiments, in response to unsuccessfully reading the requested data from the first storage drive, the system reports a fault associated with the solid state drive. In response to unsuccessfully reading the requested data from both the first storage drive and the second storage drive, the system reports a fault associated with the second storage drive.

In some embodiments, the third storage drive is of a same or a different type as the second storage drive, and a type for the first storage drive, the second storage drive, and the third storage drive comprises one or more of: a solid state drive; a hard disk drive; and a storage medium which comprises one or more of: magnetoresistive random-access memory (MRAM); resistive RAM (ReRAM); phase change memory (PCM); nano-RAM (NRAM); and ferroelectric RAM (FRAM).

In some embodiments, in response to unsuccessfully reading the requested data from the third storage drive, the system reports a fault associated with the third storage drive, and the system generates a notification indicating that the requested data is not available from a first available zone comprising the first storage drive, the second storage drive, and the third storage drive, wherein the notification further indicates to recover the requested data from a second available zone.

In some embodiments, the first storage drive, the second storage drive, and the third storage drive comprise a first available zone of a plurality of available zones, and replicas of the requested data are stored in a respective available zone.

In some embodiments, prior to receiving the request to read the data, the system receives a request to write the data to the first storage drive, the second storage drive, and the third storage drive, which involves: simultaneously writing the data to a write cache of each of the first storage drive, the second storage drive, and the third storage drive; and committing the write request upon successfully writing the data to the write cache of each of the first storage drive, the second storage drive, and the third storage drive.

In some embodiments, subsequent to writing the data to the write cache of each of the first storage drive, the second storage drive, and the third storage drive, the system writes the data asynchronously from the write cache to a non-volatile memory of each of the first storage drive, the second storage drive, and the third storage drive.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of increasing the efficiency and performance of a distributed storage system by providing a hierarchy of access layers, which can ensure the high availability of service and data while reducing the total cost of ownership.

As described above, one example of a distributed storage system is a hyperscale storage system, which facilitates achieving a massive scale in computing, e.g., for big data or cloud computing. A hyperscale infrastructure must ensure both high availability and data reliability for the corresponding massive scale in computing. One way to ensure the high availability and data reliability in a hyperscale infrastructure is to use multiple available zones, which are constructed to synchronize data and provide service in a consistent manner. Each available zone may include multiple storage clusters, and each storage cluster may be deployed with a distributed file system which maintains multiple replicas of given data. For example, in a hyperscale infrastructure with three available zones, where each available zone has three replicas, the same data is stored nine times. As current applications continue to pursue and require fast access, all nine of the replicas may be stored on high-speed solid state drives (SSDs). However, these high-speed SSDs can be expensive. Meeting the needs of current applications in this way can thus result in a high cost for the overall storage system. As the hyperscale infrastructure scales out and grows, the ability to provide an efficient system which can both scale out and perform at a reasonable pace becomes critical. Furthermore, the total cost of ownership (TCO) can become a critical factor.

The embodiments described herein address these challenges by providing a system which increases the efficiency and performance of a distributed storage system by providing a hierarchy of access layers. The system can use "low-cost SSDs" and "low-cost HDDs" in a layered hierarchy to store the multiple replicas of data required by a given application. An example of a low-cost SSD is a quad-level cell (QLC) SSD, which includes multi-level cell (MLC) memory elements which can store four bits of information, in contrast with a single-level cell (SLC) memory element which can only store a single bit of information. An MLC-based SSD can refer to a multi-level cell (MLC) which stores two bits, while a triple-level cell (TLC) stores three bits and a quad-level cell (QLC) stores four bits. In general, an SLC-based SSD has features which include a high capacity and a high endurance (e.g., can endure a large number of program/erase cycles), and are currently the most expensive SSDs. As the number of bits per cell increases (e.g., MLC→TLC→QLC), so decreases the cost of the associated SSD as well as the endurance. Hence, the QLC SSD is an example of a low-cost SSD.

An example of a low-cost HDD is a shingled magnetic recording (SMR) drive, which writes data sequentially to overlapping or "shingled" tracks. An SMR HDD generally has a higher read latency than the read latency of a conventional magnetic recording (CMR) drive, but the SMR HDD is generally a lower cost alternative, and can be useful for sequential workloads where large amounts of data can be written sequentially, followed by random reads for processing and archive retrieval (e.g., video surveillance, object storage, and cloud services). Hence, an SMR drive is an example of a low-cost HDD.

In the embodiments described herein, the system can construct available zones (or storage clusters) which include low-cost SSDs and low-cost HDDs. In one embodiment, an available zone can include one low-cost SSD and two low-cost HDDs, as described below in relation to FIGS. 3 and 4. The system can ensure the high availability of service and data without a loss in performance (e.g., in access latency and throughput), and can also provide a reduction of the total cost of ownership (TCO).

Each available zone or storage cluster can include multiple storage nodes, and each storage node can include multiple low-cost SSDs and multiple low-cost HDDs. In addition, each storage node can deploy a write cache. When a replica of a given data is to be written to an available zone (which can include, heterogeneous storage devices, e.g., one low-cost SSD and two low-cost HDDs on different storage nodes), each write cache associated with a specific storage node can be written simultaneously, and can thus provide execution of a low-latency write, followed by a commit to the host. Subsequently, the data in the write cache can be written asynchronously from the write cache to the non-volatile memory of the respective low-cost SSD or low-cost HDD. Data is thus written in a layered, hierarchical manner, which can result in an improved distributed storage system that can support a growing hyperscale infrastructure. An exemplary write operation is described below in relation to FIG. 3, and an exemplary read operation is described below in relation to FIG. 4.

Thus, by constructing multiple available zones and by using the hierarchical layers of access, the embodiments described herein provide a distributed storage system which can ensure both high availability and data reliability to meet the increasing needs of current applications.

A "storage drive" refers to a device or a drive with a non-volatile memory which can provide persistent storage of data, e.g., a solid state drive (SSD) or a hard disk drive (HDD).

A "storage server" or a "storage node" refers to a computing device which can include multiple storage drives. A distributed storage system can include multiple storage servers or storage nodes.

A "compute node" refers to a computing device which can perform as a client device or a host device. A distributed storage system can include multiple compute nodes.

A "storage cluster" or an "available zone" is a grouping of storage servers, storage nodes, or storage drives in a distributed storage system.

A "low-cost SSD" refers to an SSD which has a lower cost compared to currently available SSDs, and may have a lower endurance than other currently available SSDS. An example of a low-cost SSD is a QLC SSD.

A "low-cost HDD" refers to a HDD which has a lower cost compared to currently available HDDs, and may have a higher read or access latency than other currently available HDDs. An example of a low-cost HDD is an SMR HDD. While the embodiments and Figures described herein refer to low-cost SSDs and low-cost HDDs, in some embodiments, the storage drives depicted as low-cost SSDs and low-cost HDDs can include other types of storage drives, including but not limited to: magnetoresistive random-access memory (MRAM); resistive RAM (ReRAM); phase change memory (PCM); nano-RAM (NRAM); and ferroelectric RAM (FRAM).

Figure 1:
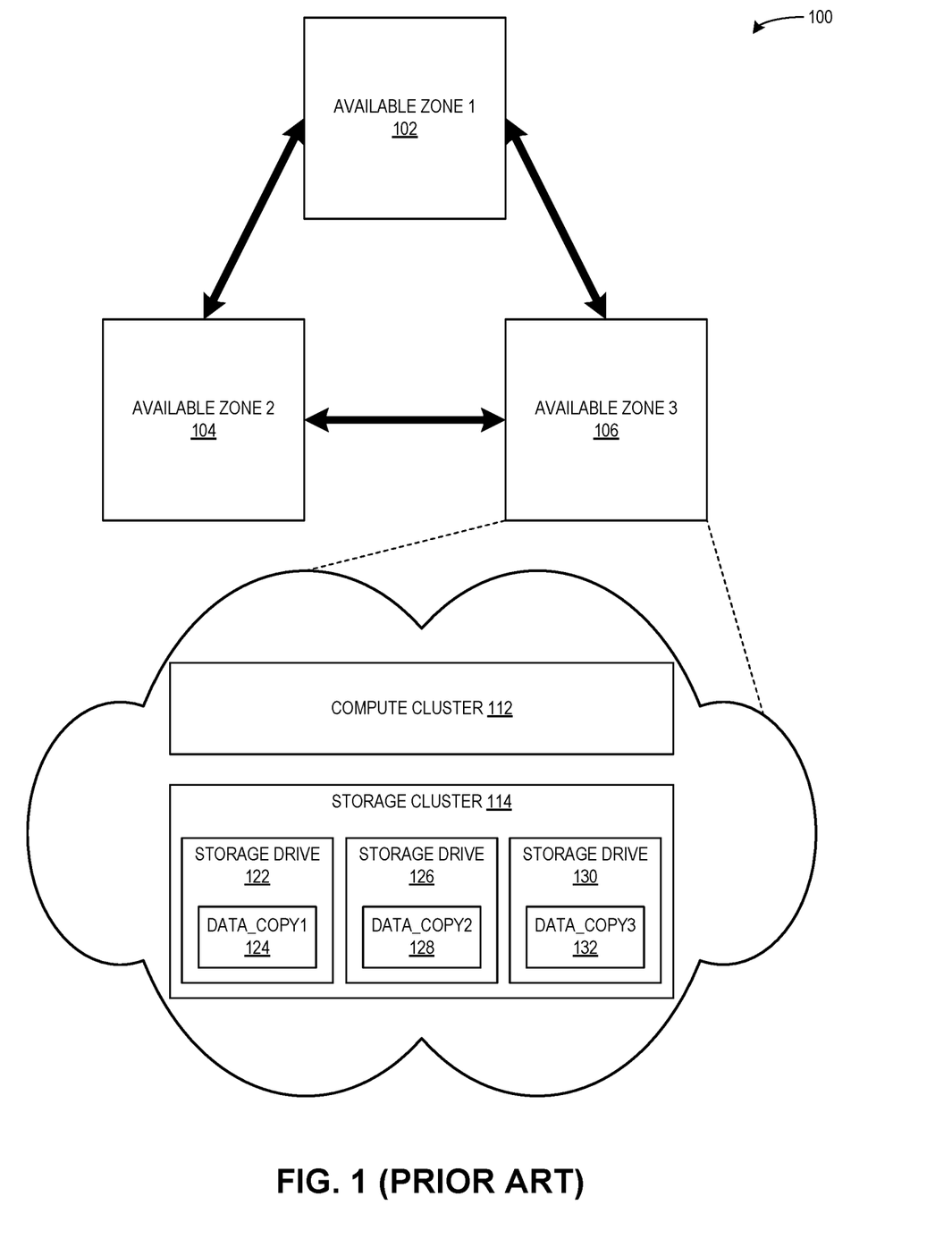
FIG. 1 illustrates an exemplary environment which demonstrates data placement in a distributed storage system with multiple available zones, in accordance with the prior art.

Inefficiency of Data Placement in a Distributed Storage System with Multiple Available Zones in the Prior Art FIG. 1 illustrates an exemplary environment 100 which demonstrates data placement in a distributed storage system with multiple available zones, in accordance with the prior art. Environment 100 includes three available zones (AZ): an available zone 1 102; an available zone 2 104; and an available zone 3 106. The distributed storage system can use the multiple available zones to synchronize data and provide service in a consistent manner, by storing multiple replicas of given data on each available zone. In environment 100, each available zone can indicate a storage cluster, and each cluster can be deployed with a distributed file system which maintains three replicas on each cluster.

For example, available zone 3 106 can include a compute cluster 112 and a storage cluster 114. Storage cluster 114 can include three storage drives, and each storage drive can include a copy of given data. A storage drive 122 can include a data_copy1 124; a storage drive 126 can include a data_copy2 128; and a storage drive 130 can include a data_copy3 132. Thus, the distributed storage system with three storage clusters (e.g., AZs) depicted in environment 100 stores the data nine separate times. As current applications require fast access to stored data, each storage drive can be a standard solid state drive (SSD). These standard SSDs are expensive, which can lead to a high overall total cost of ownership (TCO).

Figure 2:
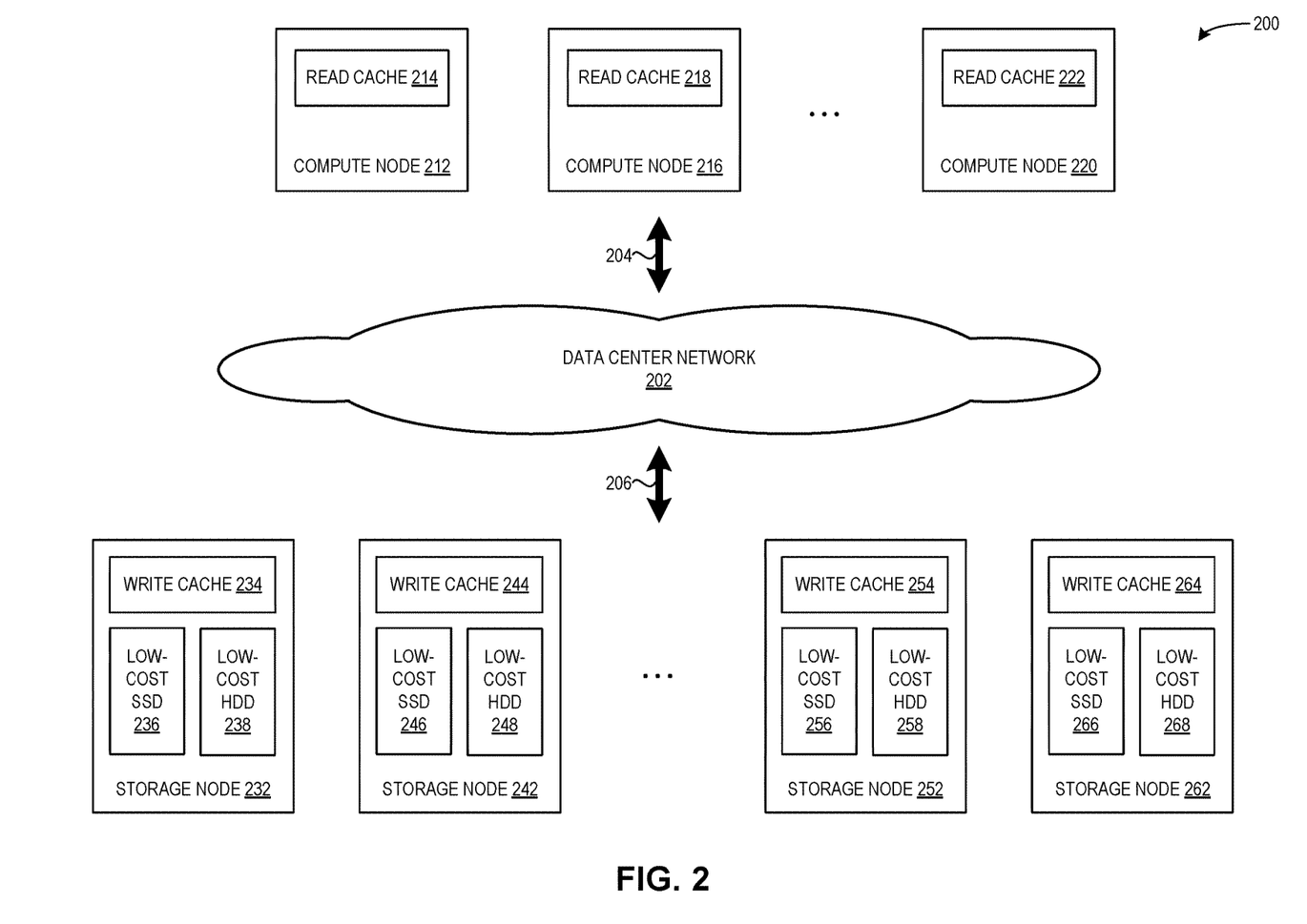
FIG. 2 illustrates an exemplary environment which facilitates data placement in a distributed storage system with multiple available zones, in accordance with an embodiment of the present application.

Exemplary Environment and Architecture for Facilitating Data Placement in a Distributed Storage System with Multiple Zones FIG. 2 illustrates an exemplary environment 200 which facilitates data placement in a distributed storage system with multiple available zones, in accordance with an embodiment of the present application. Environment 200 can be a distributed storage system which includes compute nodes and storage nodes, which communicate with each other over a data center network 202 (e.g., via communications 204 and 206). Each compute node can include a read cache, and each storage node can include a write cache. For example, a compute node 212 can include a read cache 214, a compute node 216 can include a read cache 218, and a compute node 220 can include a read cache 222. A storage node 232 can include a write cache 234. Similarly, storage nodes 242, 252, and 262 can include, respectively, write caches 244, 254, and 264.

In addition to a write cache, each storage node can include multiple storage drives, including a low-cost SSD and a low-cost HDD. This is in contrast to conventional storage nodes which include only the conventional high-cost SSDs, as described above in relation to FIG. 1. For example, storage node 232 can include a low-cost SSD 236 and a low-cost HDD 238. Similarly, storage nodes 242, 252, and 262 can include, respectively, low-cost SSDs (246, 256, and 266) as well as low-cost HDDs (248, 258, and 268).

Each storage node can maintain the low-cost SSD to ensure the shorter (e.g., faster) read latency as compared to an HDD. While each storage node in environment 200 is depicted as including only one low-cost SSD and one low-cost HDD, each storage node can include any number of low-cost SSDs and low-cost HDDs. Furthermore, the exemplary environments of FIGS. 3 and 4 depict one embodiment of the present application, in which each storage node, storage cluster, or available zone includes one low-cost SSD and two low-cost HDDs.

The system can use the read cache of a compute node to decrease the average latency of a read operation, and can also use the write cache of a storage node to decrease the average latency of a write operation. Exemplary environments for facilitating communications via communications 204 and 206 are described below in relation to FIG. 3 (write operation) and FIG. 4 (read operation).

Exemplary Environment for Facilitating Write Operations

Figure 3:
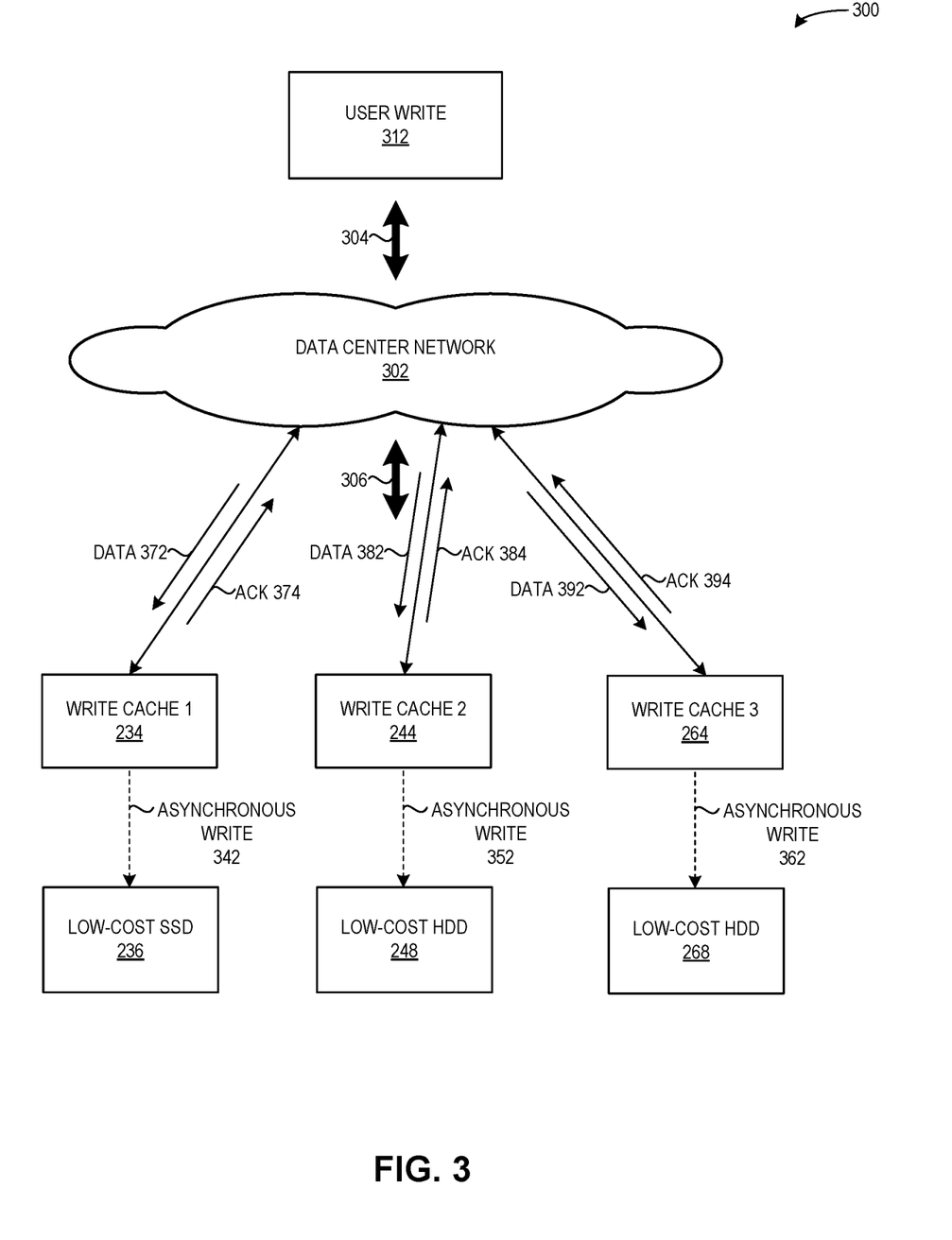
FIG. 3 illustrates an exemplary environment which facilitates data placement in a distributed storage system with multiple available zones, including exemplary write operations, in accordance with an embodiment of the present application.
Figure 4:
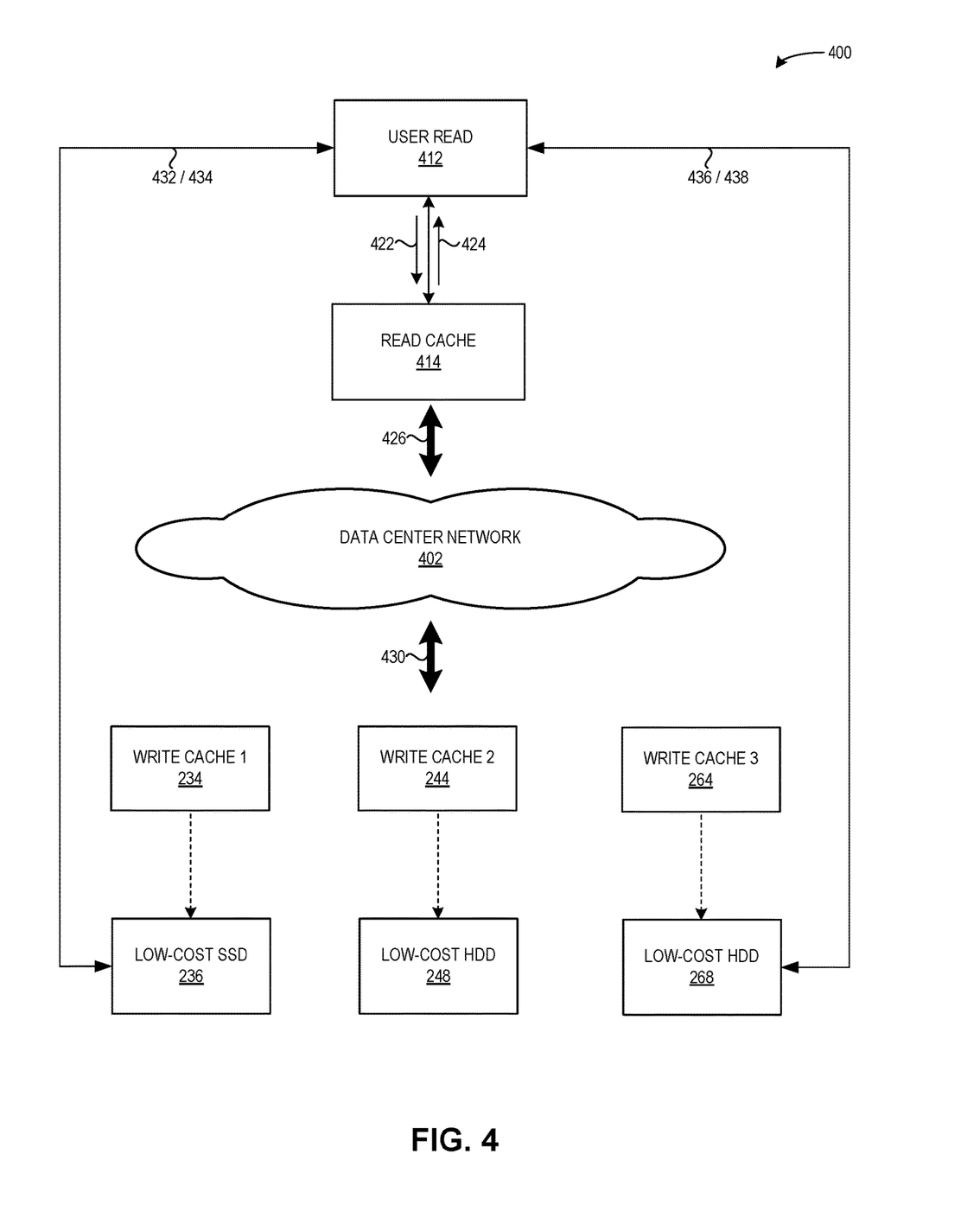
FIG. 4 illustrates an exemplary environment which facilitates data placement in a distributed storage system with multiple available zones, including exemplary read operations, in accordance with an embodiment of the present application.

FIG. 3 illustrates an exemplary environment 300 which facilitates data placement in a distributed storage system with multiple available zones, including exemplary write operations, in accordance with an embodiment of the present application. Environment 300 can include a storage node, storage cluster, or available zone which includes multiple drives, such as a low-cost SSD 236, a low-cost HDD 248, and a low-cost HDD 268. Note that these multiple drives can be part of a same storage cluster or available zone, but can reside on different storage nodes/servers. In some embodiments, these multiple drives (236, 248, and 268) can reside on the same storage node/server. The multiple drives can communicate with compute nodes or other client devices via a data center network 302.

During operation, the system can receive a user write operation 312 via a communication 304. The system can write data corresponding to user write operation 312 to multiple write caches simultaneously (e.g., via a communication 306). For example, at the same time or in a parallel manner, the system can: write data 372 to write cache 1 234 associated with low-cost SSD 236; write data 382 to write cache 2 244 associated with low-cost HDD 248; and write data 392 to write cache 3 264 associated with low-cost HDD 268. Once the data (372, 382, and 392) is successfully written to the respective write cache, the system can commit the current write operation. That is, the system can send an acknowledgement to the host confirming the successful write (e.g., via acknowledgments 374, 384, and 394). At a subsequent time, the system can perform an asynchronous write operation by writing the data stored in the write cache to the non-volatile memory of the storage drive.

For example, after data 372 is successfully stored in write cache 1 234, the system can perform an asynchronous write 342 to write the data from write cache 1 234 to the non-volatile memory of low-cost SSD 236. Similarly, after data 382 is successfully stored in write cache 2 244, the system can perform an asynchronous write 352 to write the data from write cache 2 244 to the non-volatile memory of low-cost HDD 248. Additionally, after data 392 is successfully stored in write cache 3 264, the system can perform an asynchronous write 362 to write the data from write cache 3 264 to the non-volatile memory of low-cost HDD 268.

The asynchronous write can be part of a background operation, and can remain not visible to a front-end user. That is, the asynchronous write operation can be performed without affecting the front-end user. Furthermore, an asynchronous write (e.g., asynchronous write 342) can be performed subsequent to the successful write of data to a respective write cache (e.g., data 372 to write cache 1 234), or upon sending the acknowledgment to the host (e.g., acknowledgment 374). Thus, the system can efficiently serve the front-end user with a low latency for the write operation, via the low-capacity, low-latency write cache.

Exemplary Environment for Facilitating Read Operations

FIG. 4 illustrates an exemplary environment 400 which facilitates data placement in a distributed storage system with multiple available zones, including exemplary read operations, in accordance with an embodiment of the present application. Similar to environment 300 of FIG. 3, environment 400 can include an available zone which includes low-cost SSD 236, low-cost HDD 248, and low-cost HDD 268, along with their respective write caches (e.g., 234, 244, and 264). These drives can communicate with compute nodes or other client devices via a data center network 402 (via communications 426 and 430).

During operation, the system can receive a user read operation 412. The system can initially check the read cache of the corresponding compute node (or another compute node, depending on the configuration of the compute nodes). For example, the system can check, via a communication 422, whether read cache 414 stores the requested data. If it does, the system can return the requested data via a communication 424. If it does not, the system can return a message, via communication 424, indicating that the requested data is not stored in the read cache.

The system can then issue the read request to both a low-cost SSD and a low-cost HDD of an available zone. The system can pick the low-cost HDD randomly. For example, the system can identify low-cost SSD 236 and low-cost HDD 268 of an available zone. The system can issue the read request to both low-cost SSD 236 (via an operation 432) and low-cost HDD 268 (via an operation 436). If the requested data can be obtained from (i.e., is stored on) low-cost SSD 236, the system can read the requested data from low-cost SSD 236, and return the requested data to the host (via a communication 434). The system can drop the data obtained, if any, from low-cost HDD 268 in response to the read request (via communication 436), and can also report a fault associated with low-cost SSD 236.

If the requested data cannot be obtained from (i.e., is not stored on) low-cost SSD 236, the system can read the requested data from low-cost HDD 268, and return the requested data to the host (via a communication 438). If the requested data cannot be obtained from either low-cost SSD 236 or low-cost HDD 268, the system can report a fault associated with low-cost HDD 268, and can also identify another low-cost HDD on which the data is stored (e.g., low-cost HDD 248, which is part of the same available zone as low-cost SSD 236 and low-cost HDD 268). The system can then issue the read request to low-cost HDD 248. If the requested data can be obtained from (i.e., is stored on) low-cost HDD 248, the system can read the requested data from low-cost HDD 248, and return the requested data to the host (via a communication, not shown).

If the requested data cannot be obtained from (i.e., is not stored on) low-cost HDD 248, the system can report a fault associated with low-cost HDD 248, and can also generate a message or notification indicating that the requested data is not available from the available zone comprising low-cost SSD, low-cost HDD 248, and low-cost HDD 268. The notification can further indicate to recover the requested data from another available zone.

Note that in environment 400, upon a read cache miss, the read request is always issued to both the low-cost SSD and the (randomly selected) low-cost HDD. This hierarchy allows the system to provide control over the long-tail latency, such that if the read operation from the low-cost SSD encounters an error, the system can proceed with the simultaneously issued read operation from the first low-cost HDD. The second low-cost HDD provides an additional backup layer.

Figure 5:
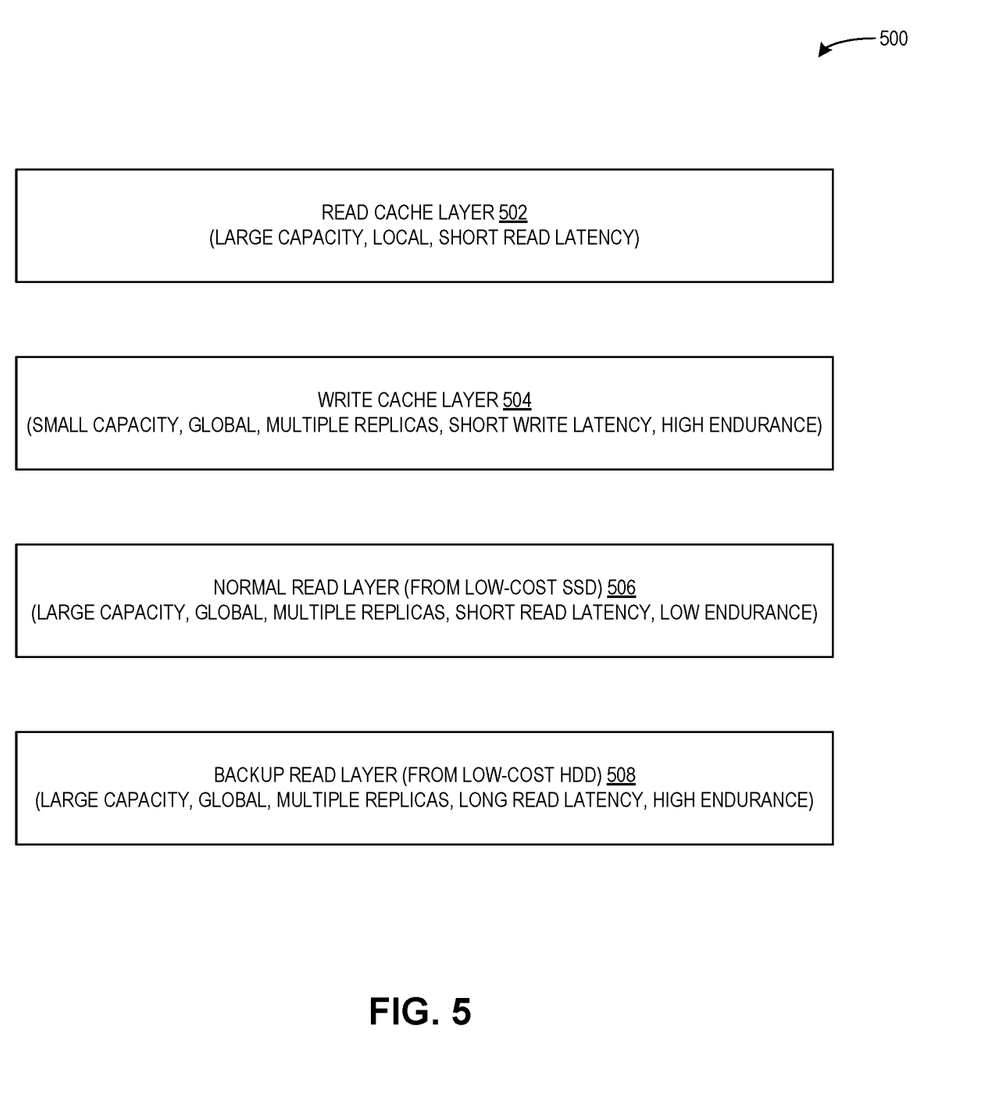
FIG. 5 illustrates an exemplary hierarchy for facilitating data placement in a distributed storage system with multiple available zones, in accordance with an embodiment of the present application.

Thus, by providing the distributed layers in the manner described in FIGS. 4 and 5, the embodiments of the system described herein can provide a more efficient and distributed storage system and a reduced total cost of ownership for multiple available zones.

Exemplary Hierarchy of Distributed Layers

FIG. 5 illustrates an exemplary hierarchy 500 for facilitating data placement in a distributed storage system with multiple available zones, in accordance with an embodiment of the present application. Hierarchy 500 can include a read cache layer 502, a write cache layer 504, a normal read layer (from low-cost SSD) 506, and a backup read layer (from low-cost HDD) 508. Read cache layer 502 can include features such as a large capacity, local access, and a short read latency (e.g., read cache 214 of FIGS. 2 and 4). Write cache layer 504 can include features such as a small capacity, global access, storage of multiple replicas, a short write latency, and a high endurance (e.g., write cache 234 of FIGS. 2 and 3).

Normal read layer (from low-cost SSD) 506 can include features such as a large capacity, global access, storage for multiple replicas, a short read latency, and a low endurance (e.g., via communications 432/434 with low-cost SSD 236 of FIG. 4). Backup read layer (from low-cost HDD) 508 can include features such as a large capacity, global access, storage for multiple replicas, a long read latency, and a high endurance (e.g., via communications 436/438 with low-cost HDD 268 of FIG. 4).

Figure 6A:
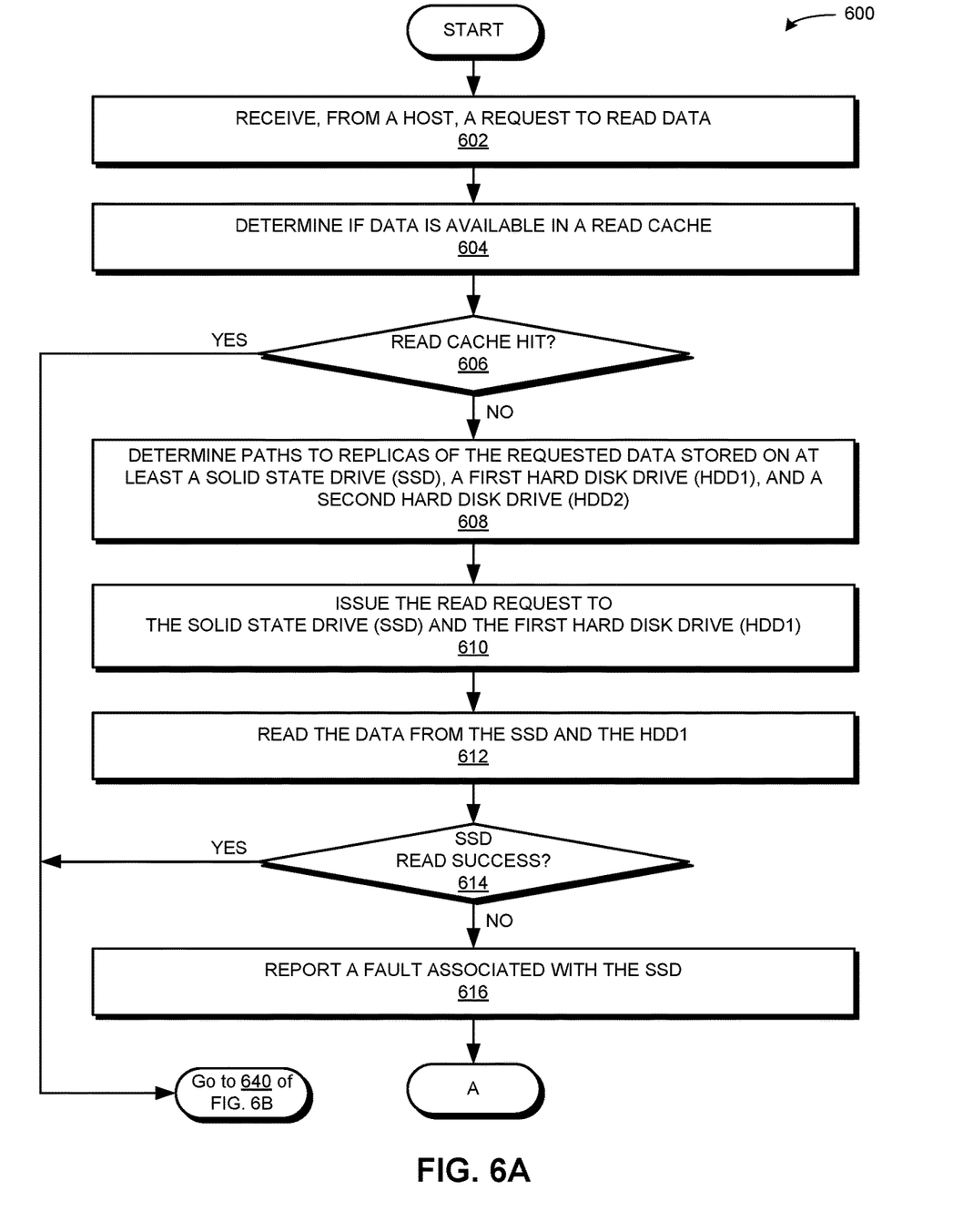
FIG. 6A presents a flowchart illustrating a method for facilitating data placement in a distributed storage system with multiple available zones, in accordance with an embodiment of the present application.

The low-cost high-capacity read cache can improve the overall performance of a distributed storage system by reducing the average read latency. The write cache, which has a small capacity and a low latency, can lead to an improvement in the overall performance of the distributed storage system while maintaining a limited cost. For example, assuming that the dollars per Gigabyte ($/GB) comparison between a conventional high-cost SSD and an HDD is 10 to 1, by storing two of the three copies of data on a low-cost HDD rather than on a conventional high-cost SSD, the system can provide an improved cost ratio of (10+10+10) to (10+1+1), which is 30 to 12, or 5 to 2, which is significantly better than the conventional 10 to 1 ratio, Exemplary Method for Mitigating Read Disturb Impact of Persistent Memory FIG. 6A presents a flowchart 600 illustrating a method for facilitating data placement in a distributed storage system with multiple available zones, in accordance with an embodiment of the present application. During operation, the system receives, from a host, a request to read data (operation 602). The system determines whether the data is available in a read cache (operation 604). If the system determines that the data is available in the read cache (i.e., a read cache hit) (decision 606), the operation continues at operation 640 of FIG. 6B.

If the system determines that the data is not available in the read cache (i.e., a read cache miss) (decision 606), the system determines paths to replicas of the requested data stored on at least a solid state drive (SSD), a first hard disk drive (HDD1), and a second hard disk drive (HDD2) (operation 608). The system can store replicas on one or more available zones, and a first available zone can include the SSD, HDD1, and HDD2. The system can select HDD1 randomly from a plurality of HDDs in the first available zone. The system issues the read request to the solid state drive (SSD) and the first hard disk drive (HDD1) (operation 610). The system reads the data from the solid state drive and the first hard disk drive (operation 612). If the system successfully reads the requested data from the solid state drive (decision 614), the operation continues at operation 640 of FIG. 6B. If the system unsuccessfully reads the requested data from the solid state drive (decision 614), the system reports a fault associated with the solid state drive (operation 616), and the operation continues at Label A of FIG. 6B.

Figure 6B:
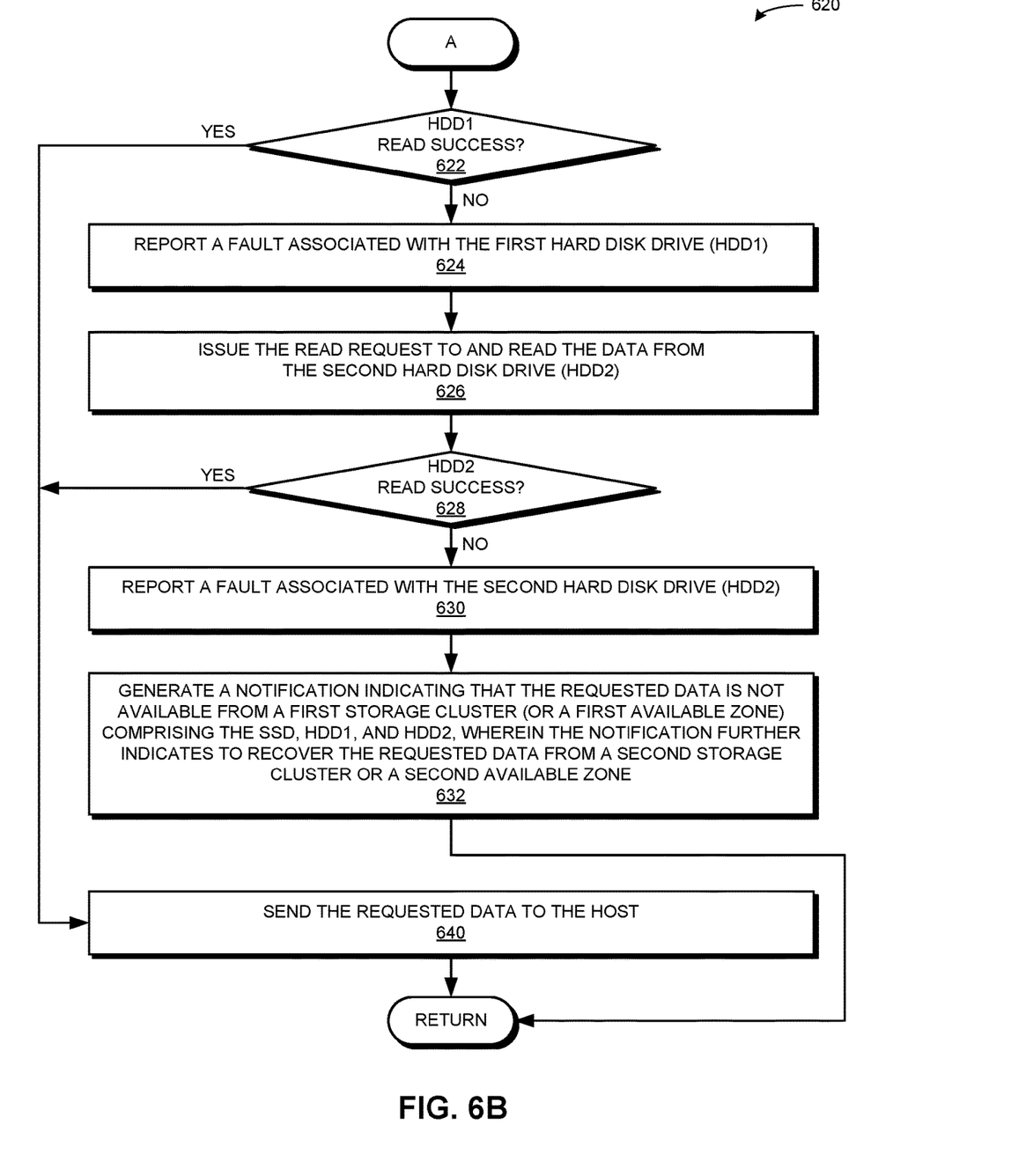
FIG. 6B presents a flowchart illustrating a method for facilitating data placement in a distributed storage system with multiple available zones, in accordance with an embodiment of the present application.

FIG. 6B presents a flowchart 620 illustrating a method for facilitating data placement in a distributed storage system with multiple available zones, in accordance with an embodiment of the present application. During operation, if the system successfully reads the requested data from the first hard disk drive (decision 622), the operation continues at operation 640. If the system unsuccessfully reads the requested data from the first hard disk drive (decision 622), the system reports a fault associated with the first hard disk drive (operation 624). The system issues the read request to and reads the data from the second hard disk drive (operation 626).

If the system successfully reads the requested data from the second hard disk drive (decision 628), the operation continues at operation 640 of FIG. 6B. The system sends the requested data to the host (operation 640), and the operation returns.

If the system unsuccessfully reads the requested data from the second hard disk drive (decision 628), the system reports a fault associated with the second hard disk drive (operation 630). The system generates a notification that the requested data is not available from a first storage cluster (or a first available zone) comprising the SSD, HDD1, and HDD2, wherein the notification indicates to recover the requested data from a second storage cluster or a second available zone (operation 632), and the operation returns.

Exemplary Computer System and Apparatus

Figure 7:
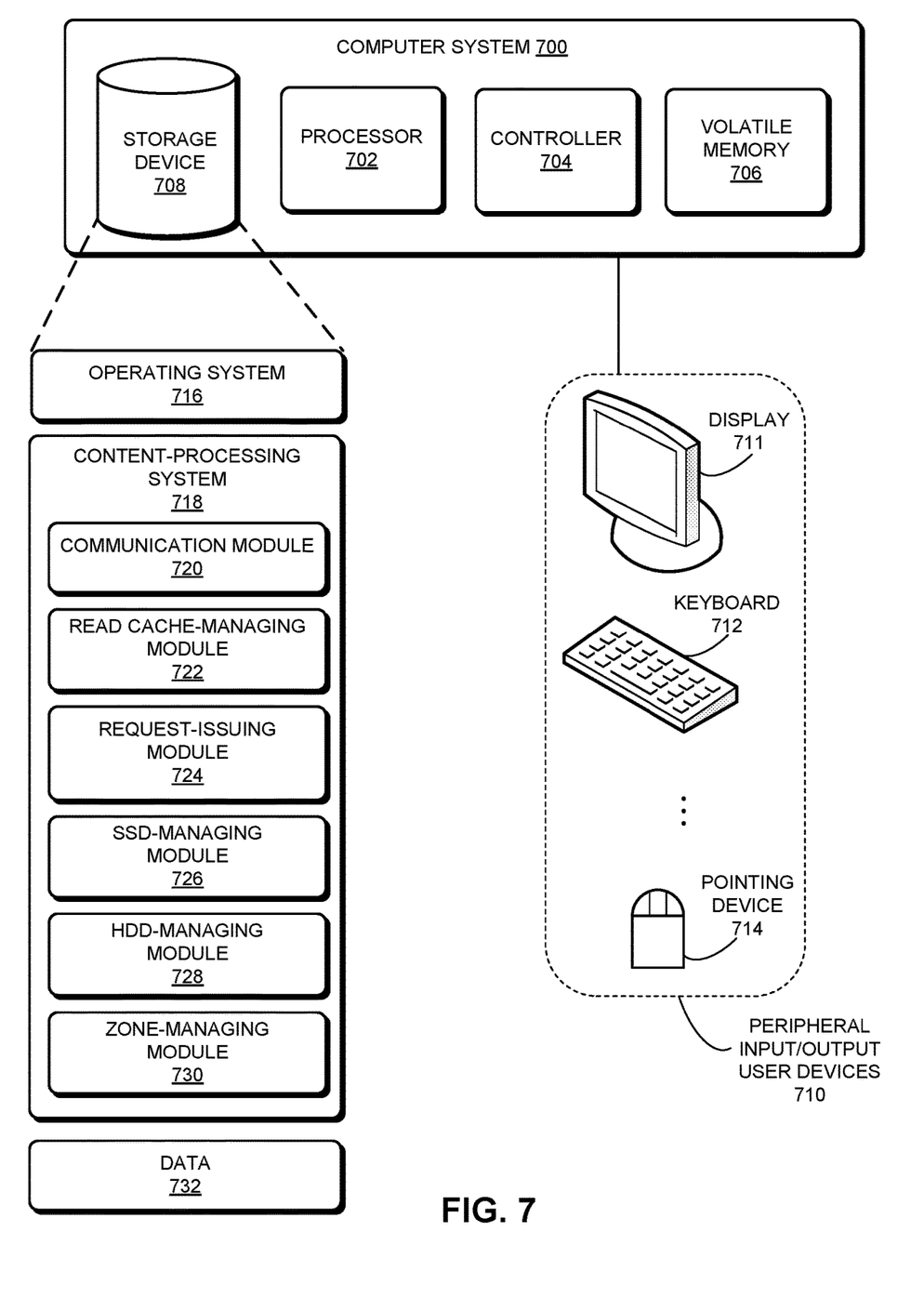
FIG. 7 illustrates an exemplary computer system that facilitates data placement in a distributed storage system with multiple available zones, in accordance with an embodiment of the present application.

FIG. 7 illustrates an exemplary computer system 700 that facilitates data placement in a distributed storage system with multiple available zones, in accordance with an embodiment of the present application. Computer system 700 includes a processor 702, a controller 704, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via controller 704. Furthermore, computer system 700 can be coupled to peripheral input/output user devices 710, such as a display device 711, a keyboard 712, and a pointing device 714. Storage device 708 can store an operating system 716, a content-processing system 718, and data 732.

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, a read request, and a write request (communication module 720).

Content-processing system 718 can further include instructions for receiving, from a host, a request to read data (communication module 720). Content-processing system 718 can include instructions for determining that the data is not available in a read cache (read cache-managing module 722). Content-processing system 718 can include instructions for issuing the read request to a solid state drive and a first hard disk drive (request-issuing module 724). Content-processing system 718 can include instructions for, in response to unsuccessfully reading the requested data from the solid state drive (SSD-managing module 726) and successfully reading the requested data from the first hard disk drive (HDD-managing module 728), sending the requested data to the host (communication module 720). Content-processing system 718 can include instructions for, in response to unsuccessfully reading the requested data from both the solid state drive and the first hard disk drive (SSD-managing module 726 and HDD-managing module 728): issuing the read request to a second hard disk drive (request-issuing module 724); and sending the requested data to the host (communication module 720).

Content-processing system 718 can include instructions for identifying, based on previously stored path information, the solid state drive, the first hard disk drive, and the second hard disk drive (zone-managing module 730). Content-processing system 718 can include instructions for selecting, from a plurality of hard disk drives on which the data is stored, the first hard drive (zone-managing module 730). Content-processing system 718 can include instructions for selecting, from the plurality of hard disk drives, the second hard disk drive (zone-managing module 730).

Data 732 can include any data that is required as input or that is generated as output by the methods and/or processes described in this disclosure. Specifically, data 732 can store at least: data; a request; a read request; a write request; data associated with a read cache or a write cache; path information for drives in a storage cluster or available zone; an identification or indicator of an available zone, a solid state drive, a hard disk drive, or other storage device; an indicator of a fault; a message; a notification; a replica; a copy of data; and an indicator of multiple available zones.

Figure 8:
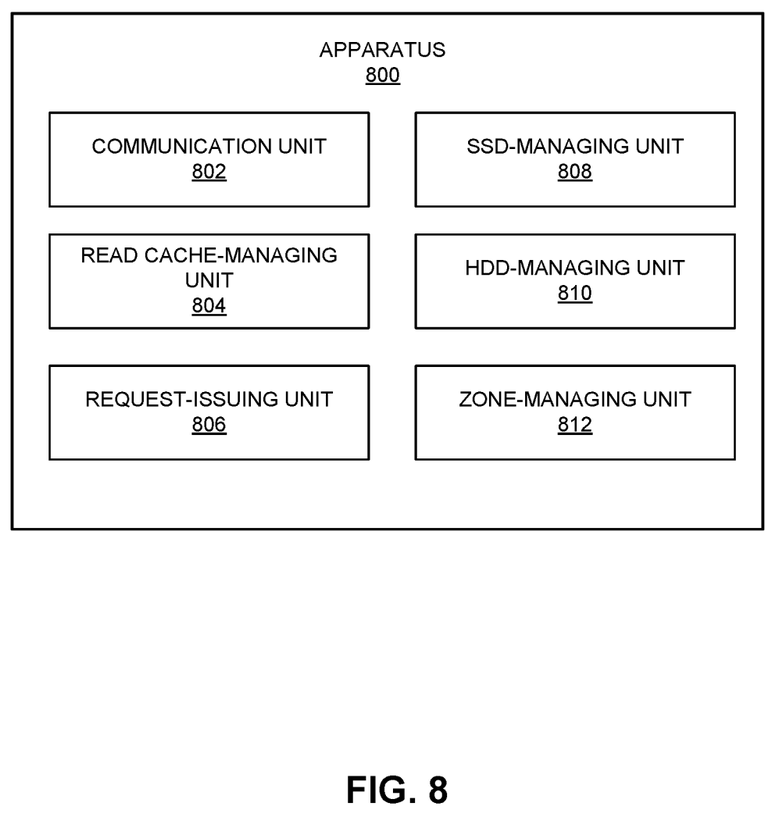
FIG. 8 illustrates an exemplary apparatus that facilitates data placement in a distributed storage system with multiple available zones, in accordance with an embodiment of the present application.

FIG. 8 illustrates an exemplary apparatus 800 that facilitates data placement in a distributed storage system with multiple available zones, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-812 which perform functions or operations similar to modules 720-730 of computer system 700 of FIG. 7, including: a communication unit 802; a read cache-managing unit 804; a request-issuing unit 806; an SSD-managing unit 808; an HDD-managing unit 810; and a zone-managing unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data placement, the method comprising:
  receiving, from a host, a request to read data;
  in response to determining that the data is not available in a read cache:
    determining replicas of the data stored on a first storage drive and a second storage drive of a different type than the first storage drive;
    issuing the read request concurrently to both the first storage drive and the second storage drive;
    in response to unsuccessfully reading the requested data from the first storage drive and successfully reading the requested data from the second storage drive, sending the requested data to the host; and
    in response to unsuccessfully reading the requested data from both the first storage drive and the second storage drive:
      issuing the read request to a third storage drive; and
      sending the requested data to the host.

2. The method of claim 1, further comprising:
  identifying, based on previously stored path information, the first storage drive, the second storage drive, and the third storage drive;
  selecting, from a plurality of storage drives on which the data is stored, the second storage drive; and
  selecting, from the plurality of storage drives, the third storage drive.

3. The method of claim 1, wherein in response to successfully reading the requested data from the first storage drive, the method further comprises:
  sending the requested data to the host; and
  dropping data read from the second storage drive.

4. The method of claim 1,
  wherein in response to unsuccessfully reading the requested data from the first storage drive, the method further comprises reporting a fault associated with the first storage drive; and
  wherein in response to unsuccessfully reading the requested data from both the first storage drive and the second storage drive, the method further comprises reporting a fault associated with the second storage drive.

5. The method of claim 1,
  wherein the third storage drive is of a same or a different type as the second storage drive, and
  wherein a type for the first storage drive, the second storage drive, and the third storage drive comprises one or more of:
    a solid state drive;
    a hard disk drive; and
    a storage medium which comprises one or more of:
    magnetoresistive random-access memory (MRAM); resistive RAM (ReRAM); phase change memory (PCM); nano-RAM (NRAM); and
    ferroelectric RAM (FRAM).

6. The method of claim 1, wherein in response to unsuccessfully reading the requested data from the third storage drive, the method further comprises:
  reporting a fault associated with the third storage drive; and
  generating a notification indicating that the requested data is not available from a first available zone comprising the first storage drive, the second storage drive, and the third storage drive,
  wherein the notification further indicates to recover the requested data from a second available zone.

7. The method of claim 1, wherein the first storage drive, the second storage drive, and the third storage drive comprise a first available zone of a plurality of available zones, and wherein replicas of the requested data are stored in a respective available zone.

8. The method of claim 1, wherein prior to receiving the request to read the data, the method further comprises receiving a request to write the data to the first storage drive, the second storage drive, and the third storage drive, which involves:
  simultaneously writing the data to a write cache of each of the first storage drive, the second storage drive, and the third storage drive; and
  committing the write request upon successfully writing the data to the write cache of each of the first storage drive, the second storage drive, and the third storage drive.

9. The method of claim 8, wherein subsequent to writing the data to the write cache of each of the first storage drive, the second storage drive, and the third storage drive, the method further comprises:

writing the data asynchronously from the write cache to a non-volatile memory of each of the first storage drive, the second storage drive, and the third storage drive.

10. A computer system for facilitating data placement, the system comprising:
a processor; and
a memory coupled to the processor and storing instructions, which when executed by the processor cause the processor to perform a method, wherein the computer system is a storage device, the method comprising:
receiving, from a host, a request to read data;
in response to determining that the data is not available in a read cache:
determining replicas of the data stored on a first storage drive and a second storage drive of a different type than the first storage drive;
issuing the read request concurrently to both the first storage drive and the second storage drive;
in response to unsuccessfully reading the requested data from the first storage drive and successfully reading the requested data from the second storage drive, sending the requested data to the host; and
in response to unsuccessfully reading the requested data from both the first storage drive and the second storage drive:
issuing the read request to a third storage drive; and
sending the requested data to the host.

11. The computer system of claim 10, wherein the method further comprises:
identifying, based on previously stored path information, the first storage drive, the second storage drive, and the third storage drive;
selecting, from a plurality of storage drives on which the data is stored, the second storage drive; and
selecting, from the plurality of storage drives, the third storage drive.

12. The computer system of claim 10, wherein in response to successfully reading the requested data from the first storage drive, the method further comprises:
sending the requested data to the host; and
dropping data read from the second storage drive.

13. The computer system of claim 10:
wherein in response to unsuccessfully reading the requested data from the first storage drive, the method further comprises reporting a fault associated with the first storage drive; and
wherein in response to unsuccessfully reading the requested data from both the first storage drive and the second storage drive, the method further comprises reporting a fault associated with the second storage drive.

14. The computer system of claim 10,
wherein the third storage drive is of a same or a different type as the second storage drive, and
wherein a type for the first storage drive, the second storage drive, and the third storage drive comprises one or more of:
a solid state drive;
a hard disk drive; and
a storage medium which comprises one or more of: magnetoresistive random-access memory (MRAM); resistive RAM (ReRAM); phase change memory (PCM); nano-RAM (NRAM); and
ferroelectric RAM (FRAM).

15. The computer system of claim 10, wherein in response to unsuccessfully reading the requested data from the third storage drive, the method further comprises:
reporting a fault associated with the third storage drive; and
generating a notification indicating that the requested data is not available from a first available zone comprising the first storage drive, the second storage drive, and the third storage drive,
wherein the notification further indicates to recover the requested data from a second available zone.

16. The computer system of claim 10, wherein the first storage drive, the second storage drive, and the third storage drive comprise a first available zone of a plurality of available zones, and wherein replicas of the requested data are stored in a respective available zone.

17. The computer system of claim 10, wherein prior to receiving the request to read the data, the method further comprises receiving a request to write the data to the first storage drive, the second storage drive, and the third storage drive, which involves:
simultaneously writing the data to a write cache of each of the first storage drive, the second storage drive, and the third storage drive; and
committing the write request upon successfully writing the data to the write cache of each of the first storage drive, the second storage drive, and the third storage drive.

18. The computer system of claim 17, wherein subsequent to writing the data to the write cache of each of the first storage drive, the second storage drive, and the third storage drive, the method further comprises:
writing the data asynchronously from the write cache to a non-volatile memory of each of the first storage drive, the second storage drive, and the third storage drive.

19. A non-transitory computer-readable storage medium storing instructions that when executed by a computer cause the computer to perform a method, the method comprising:
receiving, from a host, a request to read data;
in response to determining that the data is not available in a read cache:
determining replicas of the data stored on a first storage drive and a second storage drive of a different type than the first storage drive;
issuing the read request concurrently to both the first storage drive and the second storage drive;
in response to unsuccessfully reading the requested data from the first storage drive and successfully reading the requested data from the second storage drive, sending the requested data to the host; and
in response to unsuccessfully reading the requested data from both the first storage drive and the second storage drive:
issuing the read request to a third storage drive; and
sending the requested data to the host.

20. The storage medium of claim 19, wherein prior to receiving the request to read the data, the method further comprises receiving a request to write the data to the first storage drive, the second storage drive, and the third storage drive, which involves:
simultaneously writing the data to a write cache of each of the first storage drive, the second storage drive, and the third storage drive; and
committing the write request upon successfully writing the data to the write cache of each of the first storage drive, the second storage drive, and the third storage drive; and wherein subsequent to writing the data to the write cache of each of the first storage drive, the second storage drive, and the third storage drive, the method further comprises:

writing the data asynchronously from the write cache to a non-volatile memory of each of the first storage drive, the second storage drive, and the third storage drive.

\* \* \* \* \*